UNITED STATES PATENT OFFICE.

LEVI S. FALES, OF MONMOUTH JUNCTION, NEW JERSEY.

IMPROVEMENT IN COMPOUNDS FOR PRESERVING WOOD.

Specification forming part of Letters Patent No. 142,453, dated September 2, 1873; application filed May 6, 1873.

*To all whom it may concern:*

Be it known that I, LEVI S. FALES, of Monmouth Junction, in the county of Middlesex and State of New Jersey, have invented a certain Compound for Preserving and Staining Timber, of which the following is specification:

The object of my invention is to produce a compound with which railroad-ties, or other timber or lumber of greater or less dimensions, can be impregnated, so as to make it proof against the influence of the atmosphere and moisture, and at the same time to give it any desired color.

The importance of my invention lies in the fact that wooden ties, &c., prepared with my improved compound will have more firmness, last longer, and at the same time be less expensive than those protected by other means.

My invention consists in preparing a compound by the mixture of the following ingredients, in about the proportions set forth: To ten gallons of raw petroleum I use about ten gallons of the residuum from refined petroleum, generally termed " waste acid," but from which the sulphuric acid has been separated, one gallon of linseed-oil, and five pounds of slaked lime. The whole mixture is to be put in a kettle and boiled for about four to five hours. After this I add to the mixture the following ingredients, viz: About ten pounds of common rosin, about one pound of gum shellac, and three gallons of extract of coal-tar, termed " dead-oil," obtained from distilled coal-tar. The article to be saturated is then immersed in the liquid while the same has a temperature of about 300° Fahrenheit, and is left therein for about one to two hours.

If sticks or pieces of smaller size are to be impregnated it will suffice to apply the mixture while hot by means of a brush.

The petroleum and the other oils in the composition are to serve as vehicles for conveying the entire compound into the pores of the wood. The slaked lime serves to decompose the organic impurities in the pores, and also as an excellent preserving medium, and also to neutralize any traces of acid that may be in the compound, while the rosin, shellac, and dead-oil from the coal-tar give body to the mixture, and make the same more or less water-proof, thus preventing moisture or the atmosphere from gaining access to the interior of the pores.

The dead-oil from coal-tar in the composition will give to the impregnated wood a color similar to that of black walnut. The shade of color, however, may be varied at pleasure by changing the quantity of dead-oil from coal-tar used. By adding any suitable other coloring material the color itself may also be changed to suit taste.

Wood treated with this compound does not require to be painted either for improving its appearance or for protection.

I claim as my invention and desire to secure by Letters Patent—

The composition consisting of the ingredients stated, in about the proportions set forth, and for the purpose specified.

LEVI S. FALES.

Witnesses:
HENRY T. BROWN,
MICHAEL RYAN.